Feb. 11, 1969 R. P. DINGWALL ET AL 3,426,453

MAGNETIC DISPLAY DEVICE

Filed May 22, 1967

INVENTORS
ROBERT P. DINGWALL
HAIK MARCAR

BY Robert E. Sundt
ATTORNEY

United States Patent Office 3,426,453
Patented Feb. 11, 1969

3,426,453
MAGNETIC DISPLAY DEVICE

Robert P. Dingwall, Mahopac, N.Y., and Haik Marcar, San Jose, Calif., assignors to International Business Machines Corporation, Armonk, N.Y., a corporation of New York Filed May 22, 1967, Ser. No. 640,024
U.S. Cl. 35—61 5 Claims
Int. Cl. G09b *1/08;* G09f *7/04*

ABSTRACT OF THE DISCLOSURE

A multiplicity of magnetic cylinders having contrastingly colored end faces, disposed one each in cylindrical pockets formed in a laminar display board having a transparent cover and magnetized laminations both translate and rotate to selectively expose a contrasting surface to view when a magnetized writing stylus is moved over the display surface. The magnetized laminae latch the cylinders in their binary positions and provide the rotating and latching force therefor.

BACKGROUND OF THE INVENTION

This invention relates to display devices of the monograph type wherein individual magnetic cylinders are both translated and rotated under the combined influence of a writing stylus and the magnetic force of permanently magnetized laminae in the display board which has individual sockets for each cylinder.

DESCRIPTION OF THE PRIOR ART

Magnetic slates or chalkless blackboards are well known in the art. These may be broadly grouped into three classes as follows:

(a) Those wherein the magnetized stylus coagulates the magnetic particles to produce the display.

(b) Those wherein the stylus moves the magnetic particles, which are individually contained in pockets, forward into view.

(c) Those wherein the stylus rotates individual spherical particles having contrastingly colored hemispheres and contained within individual pockets.

Of the patents in group (a) the Herzog Patent 2,853,-830 is exemplary. Group (b) patents are of the type shown in McDonald 3,103,751. The rotating sphere patents of group (c) are exemplified by the C. R. Tate Re.-Re. 25,822 (July 20, 1965) patent.

SUMMARY

The present invention may be thought of as combining the functional features of the McDonald and Tate patents, supra, in that by virtue of its structure, the magnetic particles both rotate and move forward into view to produce the monograph types of display. This combined movement is the result of the attraction of the magnetized writing stylus and the interplay of the magnetic fields produced by the permanently magnetized laminae of the display board. As a consequence of this combined movement the contrast of the display is markedly improved. In addition, the board may be used in any position and even subjected to mild shock, because the individual particles are magnetically latched in their viewing or nonviewing position.

In accordance with the foregoing principle of operation it is an object of this invention to provide a magnetic display device having a multiplicity of magnetic particles each contained in an individual pocket in a laminated display board having at least one permanently magnetized lamination whereby the particles are both rotated and translated within their pockets by the combined force of magnetized stylus and the magnetized lamina.

The foregoing and other objects, features and advantages of the invention will be apparent from the following more particular description of preferred embodiments of the invention, as illustrated in the accompanying drawings.

Figure 1A:
FIG. 1A is a sectional view of the writing stylus.
Figure 1:
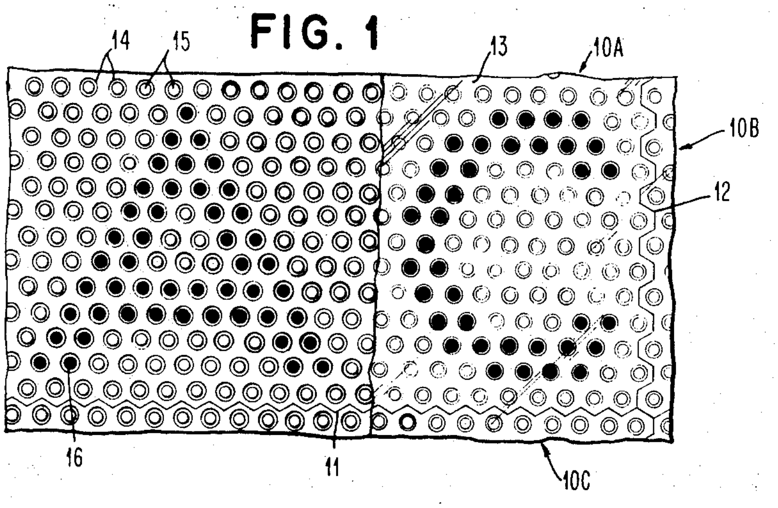
FIG. 1 is a plan view common to the several embodiments of the invention.

That which is common to the several embodiments whose plan view is shown in FIG. 1 is a matrix of holes, or pockets, formed in a permanently magnetized laminated board and covered with a transparent lamina. Each pocket contains a magnetic slug with contrastingly colored faces such that the slugs are normally retracted from view with their faces having a color matching that of the board facing forward. This presents a substantially uniformly colored display area to view. As a magnetized writing stylus is passed over the board, the individual slugs are attracted to the viewing surface and rotated to present a line of contrastingly colored dots to view. These dots are blended by the eye to form a substantially solid line pattern representing lexical symbols or a line drawing. Erasure is achieved by passing a reversely polarized magnet over the viewing surface to repulse the slugs and return them to their retracted positions.

Specifically, with reference to FIG. 1, the display boards 10A, 10B and 10C are formed with complementary edges. The boundary 11, for example, has a triangular sawtooth configuration which is formed in the top and bottom edges of each panel. The right and left edges of each panel are formed with a semi-hexagonal cut to form a mating boundary 12. With this modular construction the display can be constructed in multiples of the modular panels. When so formed the center-to-center distance of the cavities between any two adjacent panels is equal to the centerline distance of the holes within any one panel. Thus the mosaic pattern of holes is uniform and independent of the number of modular panels in the assembly.

From the visual viewpoint the display panels 10A, 10B and 10C present an essentially solid black panel to view under the transparent cover 13, FIG. 1 being drawn as a negative of the actual appearance because of the difficulty of showing solid black on a patent drawing. While the holes 14 and retracted slugs 15 must be shown as circles under the conventions of patent drawings, they are actually more apparent in the drawings than they are in the actual display. When, however, the magnetic writing stylus 17 (FIG. 1A) is drawn over the surface of the display the retracted slugs 15 are drawn forward and rotate to present a white face on the slugs 16 to view. This white face against the essentially black background of the panel provides a greater contrast than the negative showing of FIG. 1, the term "negative" being used in the photgroaphic sense to indicate the reversal of black and white. In FIG. 1, therefore, the letters "AC" will be presented as a succession of white dots on a black background, formed by the presence of the slugs 16 in the forward or viewing position, abutting the back surface of the transparent lamina 13 with the white face thereof exposed to view. The remaining slugs 15 will remain retracted with their black faces forward.

When erasure is necessary the magnetic eraser 18 (FIG. 2) is passed over the surface of the display area to repel the slugs 16 to their retracted position so that they then become "15" slugs. It is to be noted that the magnetic poles of the eraser 18 are oriented opposite to that of the stylus 17, which stylus could incorporate the erasure as the opposite end of the magnet.

Figure 2:
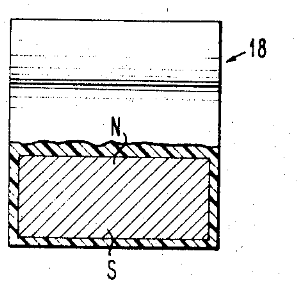
FIG. 2 is a sectional view of the magnetic eraser.
Figure 3:
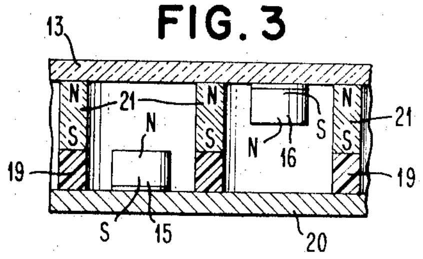
FIG. 3 is a sectional view of FIG. 1 representing the first embodiment of the invention.

Turning now to the various embodiments, which can only be adequately illustrated by the several sectional views, FIG. 3 shows the first embodiment wherein only a single magnetized lamination is employed which acts to latch the slugs in one position by magnetic attraction of unlike poles and in a second position by magnetic repulsion of like poles. Specifically the magnetic lamina 21 is magnetized with its north pole facing the transparent cover 13 and its south pole facing the non-magnetic spacer 19, the whole assembly being bonded together by suitable adhesives, together with the magnetic (but unmagnetized) bottom lamination 20. The slugs 15 and 16 (differently numbetred only because of their relative displacements) are permanently magnetized with the south pole lying in the light-colored face of the slug, the body of which is uniformly dark. When the slug 15 is retracted it is attracted by its own magnetization to the magnetic material of the backing plate 20 wherein it resides with its light face down to present the dark body to view. The slug 15 is rotated from its viewing position to its retracted position by the combined force of the erasing magnet and the magnetized lamina 21, the slug rotating to align its north pole with the south pole of the lamina. When the writing stylus 17 (FIG. 1A) is passed over the surface of the cover plate its very strong field overcomes the lesser fields of the lamina 21 and the slugs to attract the slugs forward. During their forward movement the slugs rotate to present their south pole to the north pole of the stylus and to the north pole of the lamina 21 so as to achieve a stable position. Erasure is achieved by the repulsion of the south pole of the eraser 18 (FIG. 2).

Figure 4:
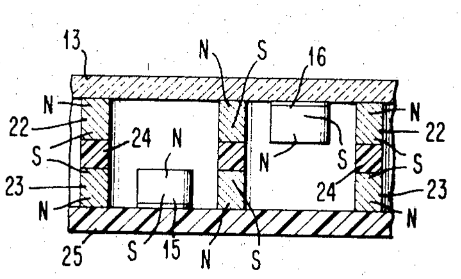
FIG. 4 is a sectional view of FIG. 1 representing the second embodiment of the invention.

The reliability of operation is enhanced by employing the construction shown in FIG. 4. In this embodiment two spaced magnetized laminae 22 and 23 are employed together with magnetized slugs having a solid colored body to match the color of the laminations (preferably black) and a light-colored face. The layer 22 immediately beneath the transparent cover 13 is polarized with its north pole facing the cover. Spacer 24 is non-magnetic and adhered to both laminae 22 and 23 by suitable bonding compounds, lamina 23 being polarized with its south pole facing the south pole of lamina 22. The slugs, as previously described, are polarized with the south pole in the light face thereof. The bottom plate 25 is non-magnetic and may be made transparent so that the display is reversible. Typical dimensions employed in the embodiment of FIG. 4 include slug dimensions of .040" diameter by .030" long, holes of .062" diameter by .090" long, spaced .082" on centers. The length of the holes 14 made up of aligned holes in laminations 22 and 23 (each .030" thick) and a hole in spacer 24 (.020" thick).

It will be apparent that in the embodiment of FIG. 4 the magnetized slugs are latched in their respective positions by the attractive forces of unlike magnetic poles, and that the slugs must rotate to achieve a stable position in their two different possible positions. It is also apparent that with a very strong field of the writing stylus 17, the fact that the slug 15 has its north pole facing the north pole of the stylus, will not prevent the stylus from attracting and rotating the slug. On the other hand the eraser 18 with a somewhat lesser field will repel the slug which because of its momentum will penetrate the field of the lamina 23 to complete the latching action. Once the slug is latched, the field of the erasing magnet is insufficient to overcome the distance which separates it from the retracted slugs and attract them. Thus, the eraser can repel because of the close proximity of the slug, but it cannot attract. The magnetic structure provides a sort of over-center toggle action.

Figure 5:
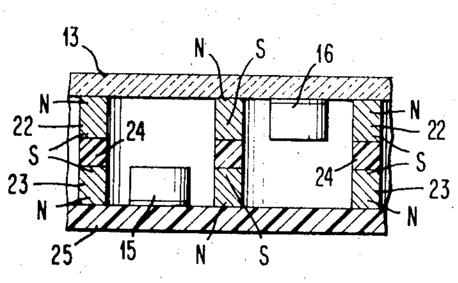
FIG. 5 is a sectional view of FIG. 1 representing the third embodiment of the invention.

In the final embodiment of FIG. 5 the structure is identical with that of FIG. 4 except that the slugs are not permanently magnetized. In this configuration they are influenced by the fields generated by the permanently magnetized laminations. Because of their hysteresis they retain the induced magnetization for a time sufficient to produce the required translation and rotation under the force of the magnetic writing stylus or erasing magnet. Once established in one of the two binary positions the slugs will be retained thereat by the magnetic force of the laminations.

From the foregoing explanation of the various embodiments it will be seen that the combined rotation and translation of the slugs produces an enhanced contrast, because the slugs in their attracted position present a flat light surface to view and in their retracted position they lie below the surface and present a dark surface to view. In addition, the magnetized laminae, or lamina, in combination with the magnetization of the slugs provides a stable latching action While the invention has been particularly shown and described with reference to preferred embodiments thereof, it will be understood by those skilled in the art that the foregoing and other changes in form and details may be made therein without departing from the spirit and scope of the invention.

What is claimed is:

1. A display device comprising:

(a) a laminar structure having at least one permanently magnetized lamination and a transparent cover formed with a plurality of spaced closed cavities; and (b) a plurality of cylindrical slugs disposed one each in each of said cavities, the slugs being fabricated of a magnetic material of a color which is non-contrasting with that of the material of which the laminar structure is fabricated and having one circular face thereof colored with a contrasting color, the said slugs having a maximum dimension less than the minimum dimension of said cavities.

2. The display device of claim 1 wherein the slugs are permanently magnetized with their polar axes parallel to the cylindrical axes.

3. The display device of claim 1 wherein there are two magnetized laminae separated by a spacer, the poles of the respective laminae being opposite to one another and parallel to the thickness of the laminations.

4. The display device of claim 3 wherein the slugs are permanently magnetized with their polar axes parallel to the cylindrical axes and the said cavities are cylindrical whereby the slugs are both translated and rotated from the non-viewing retracted position to the viewing position beneath the transparent cover under the magnetic forces of a writing stylus and the magnetized laminae.

5. A magnetic blackboard operable under the influence of a magnetized writing stylus to expose to view a pattern of members contrastingly colored with respect to the base structure of the display comprising:

(a) a transparent cover member;

(b) a first permanently magnetized lamination abutting said cover;

(c) a non-magnetic spacer lamination abutting said first magnetized lamination;

(d) a second permanently magnetized lamination abutting said spacer lamination;

(e) a bottom plate abutting said second permanently magnetized lamination, the said first and said second magnetized laminations and said spacer lamination having aligned cylindrical holes to form together with said cover and said bottom plate closed cylindrical cavities in the assembled state; and (f) a permanently magnetized cylindrical slug in each of said cavities, the polar axis of each of the slugs being parallel to the cylindrical axis, the length of the slugs being substantially equal to the thickness of the magnetized laminations, the maximum dimension of the slugs being less than the diameter of the cavities, and the slugs having one face thereof colored contrastingly with the color of the laminations;

(g) the said magnetized laminations having their magnetic polar axes opposed and parallel to the thickness of the laminations, whereby the slugs will be both translated and rotated from a non-viewing to a viewing position beneath the transparent cover whereat their contrastingly colored faces will be exposed to view to create the display.

References Cited

UNITED STATES PATENTS

| | | | |
|---|---|---|---|
| Re. 25,822 | 7/1965 | Tate | 35—66 |
| 2,589,601 | 3/1952 | Burnett | 35—66 |
| 3,103,751 | 9/1963 | McDonald | 35—61 |
| 3,140,553 | 7/1964 | Taylor | 40—28 |
| 3,214,171 | 10/1965 | Luchsinger | 46—240 X |
| 3,295,238 | 1/1967 | Winrow | 40—28 |

FOREIGN PATENTS

| | | |
|---|---|---|
| 102,151 | 7/1963 | Norway. |

EUGENE R. CAPOZIO, *Primary Examiner.*

HARLAND S. SKOGQUIST, *Assistant Examiner.*

U.S. Cl. X.R.

35—66; 40—28; 46—239; 335—306